Feb. 4, 1969　　　　K. K. KESLING　　　3,426,110
REFRIGERATING APPARATUS
Filed March 26, 1965　　　　　　　　　　　Sheet 1 of 3

INVENTOR.
Keith K. Kesling
BY
Carl A. Stickel
HIS ATTORNEY

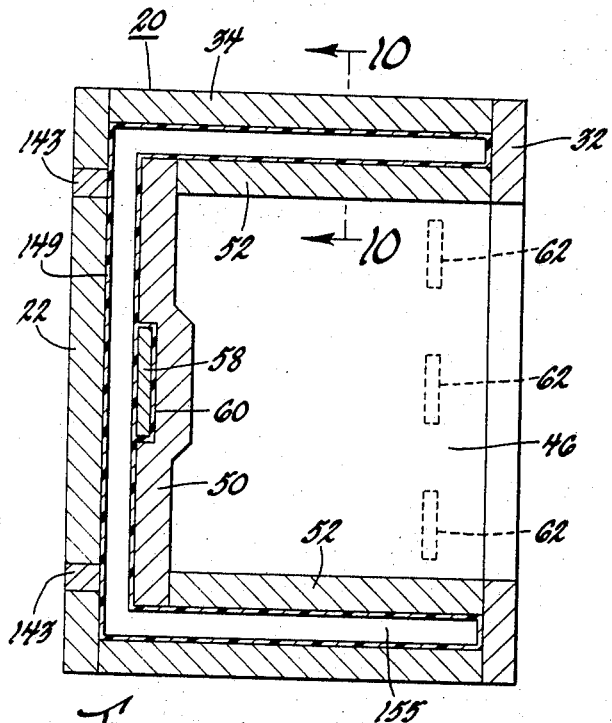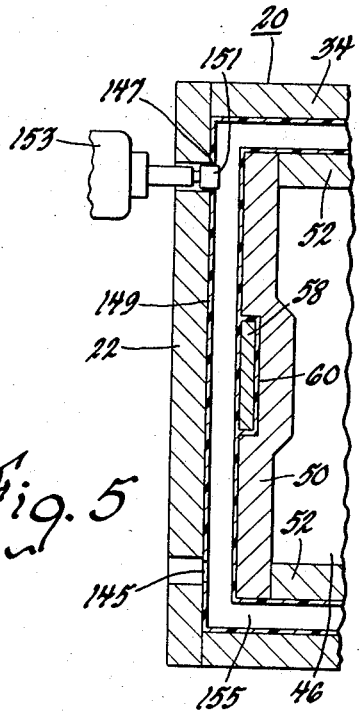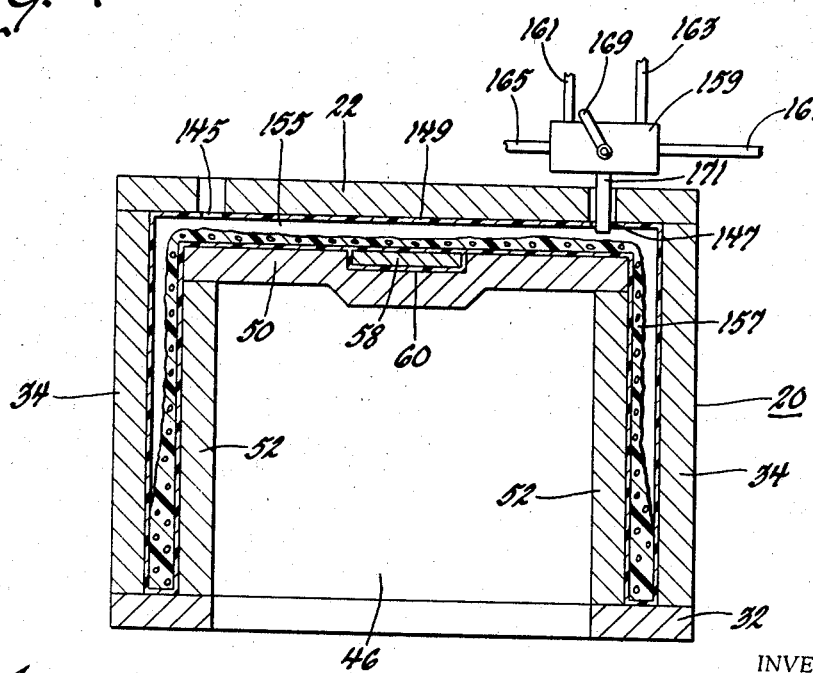

Feb. 4, 1969 K. K. KESLING 3,426,110
REFRIGERATING APPARATUS
Filed March 26, 1965 Sheet 3 of 3

INVENTOR.
Keith K. Kesling
BY Carl A Stickel
HIS ATTORNEY

United States Patent Office 3,426,110
Patented Feb. 4, 1969

3,426,110
REFRIGERATING APPARATUS
Keith K. Kesling, Dayton, Ohio, assignor to General Motors Corporation, Detroit, Mich., a corporation of Michigan
Filed Mar. 26, 1965, Ser. No. 443,041
U.S. Cl. 264—46                3 Claims
Int. Cl. B32b 5/20, 1/06

ABSTRACT OF THE DISCLOSURE

In the preferred form, a multiple compartment insulated refrigerator cabinet is formed within a hollow walled mold which includes outer rear, top, bottom, side and front walls together with removable inner walls for the lower, upper, rear and side walls of each compartment which are spaced from the outer walls to provide a continuous hollow space between them. Insertions are provided between these walls for forming air circulating ducts. The mold is heated to an elevated temperature and a measured amount of plastic resin suitable for forming the wall surfaces is introduced and the mold is rotated about one axis and revolves about another axis to distribute the resin throughout the heated hollow walls of the mold until all the walls are coated with the resin in a fluid state to the desired thickness. A foam forming resin is introduced into this space and expands throughout to substantially fill the remaining space with a foamed plastic resin. The insertions and the inner walls are then removed from the remainder of the mold along with the plastic structure forming the refrigerator cabinet.

---

This invention pertains in a general way to refrigerating apparatus and more particularly to a method of making insulated refrigerator cabinets by a very simple procedure.

Refrigerator cabinets are currently being made predominantly by forming and welding the outer sheet metal walls to form a cabinet shell and welding together the inner sheet metal walls to form one or more inner liners. After this, the insulation, the inner liners, the refrigerating system and the wiring are installed. Finally gussets, breaker strips, hardware, and doors are fastened in place. With this type of manufacture, difficulties in manufacturing are frequently encountered throughout this procedure. These difficulties frequently cause delays in production, and scrapping or reoperating some of the material, all of which must be added in calculating the manufacturing cost of the refrigerator.

It is an object of this invention to provide a simple, inexpensive process wherein the entire insulated cabinet can be cast in a very simple, inexpensive trouble-free procedure.

It is another object of this invention to provide a very simple, inexpensive process wherein the hollow walls as well as the integral breaker strips forming substantially the entire inner and outer walls of the cabinet can be cast in a single simple casting operation and filled by a single simple operation with a cellular foamed insulating material which supports the hollow walls.

These and other objects are attained in the form shown in the drawings in which there is provided a hollow walled mold having inner surfaces of the configuration desired for the inner and outer walls of the cabinet as well as the breaker strip. The mold can be provided with walls forming one or two or more compartments in the cabinet insulated from one another. The cabinet is cast by inserting into the space within the hollow walls of the mold a measured amount of a plastic resin suitable for forming the walls which is sufficient to coat the inner surfaces of the walls of the mold to the thickness desired for the walls of the cabinet. The mold is heated to the elevated temperatures required to cause the plastic resin to form a viscous fluid on the inner surfaces of the walls of the mold to coat the walls to the desired thickness. Simultaneously with the heating of the mold, the mold is rotated about several axes to distribute the resin throughout the hollowed walls of the mold so that all of the walls are coated to the thickness desired. This rotation preferably is at a relatively slow speed upon several different axes. Following this, the mold is cooled sufficiently to congeal the resin as rotation continues.

After the resin coating of the walls is sufficiently congealed, one or more plugs in the mold may be removed and openings provided in the continuously hollowed wall plastic structure within the mold through which is inserted a measured quantity of materials capable of forming a foamed plastic resin to substantially fill the entire space within the hollowed wall plastic structure formed within the mold. However, if desired the hollow walls of the plastic structure may be filled with insulating material after the hollowed wall plastic structure is removed from the mold.

Further objects and advantages of the present invention will be apparent from the following description, reference being had to the accompanying drawings wherein a preferred embodiment of the present invention is clearly shown.

FIG. 4 is a horizontal sectional view taken along the lines 4—4 of FIG. 2;

FIG. 5 is a horizontal fragmentary sectional view taken along the lines of 4—4 of FIG. 2 showing the plugs removed from the back wall of the mold and the making of two openings in the back wall of the cast hollow walled plastic cabinet structure;

FIG. 6 is a horizontal sectional view taken along the line 4—4 of FIG. 2 but with the mold and hollow walled plastic cabinet structure face down illustrating the insertion of the foam forming materials through the openings in the mold and the rear wall of the cast hollow walled plastic cabinet structure;

Figure 2:
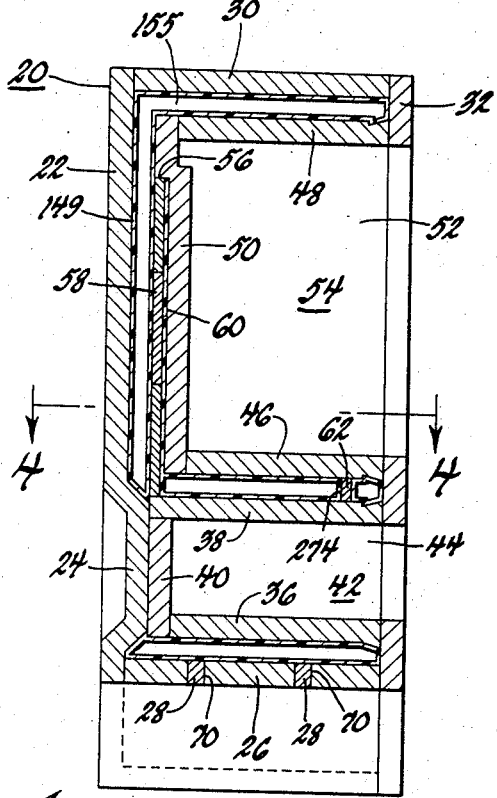
FIG. 2 is a vertical sectional view through the mold and the hollow walled plastic structure cast therein.
Figure 3:
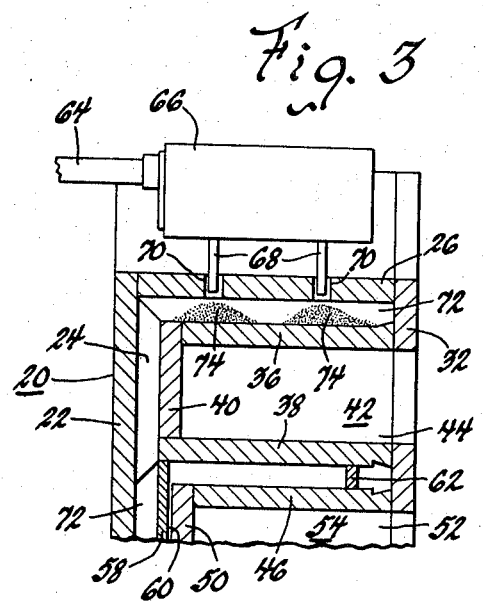
FIG. 3 is a fragmentary vertical sectional view with the mold inverted showing the filling of the mold with plastic resin prior to the casting step.
Figure 7:
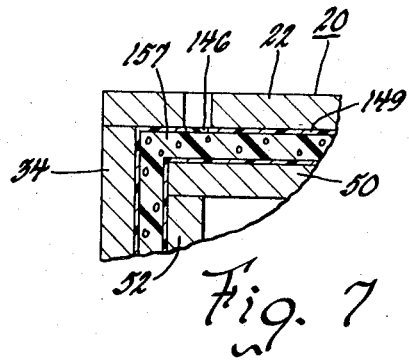
FIG. 7 is a fragmentary sectional view showing the completion of the filling of the hollow walls and the closing of the filler opening.

Referring now to the drawings and more particularly to FIGS. 2 and 3, there is shown a hollow walled mold 20 of the suitable metal such as aluminum formed of a rear wall member 22 having a large indentation 24 for providing a removable wall section at the rear of the cabinet. The mold also includes a lower outer bottom wall 26 provided with two removable plugs 28 which may be removed to fill the interior of the mold as illustrated in FIG. 3. The mold also includes an outer top wall 30, a front wall 32 and outer side walls 34. These may be joined together in any suitable way such as by screws or other fastening arrangements which may be either permanent or removable.

Figure 8:
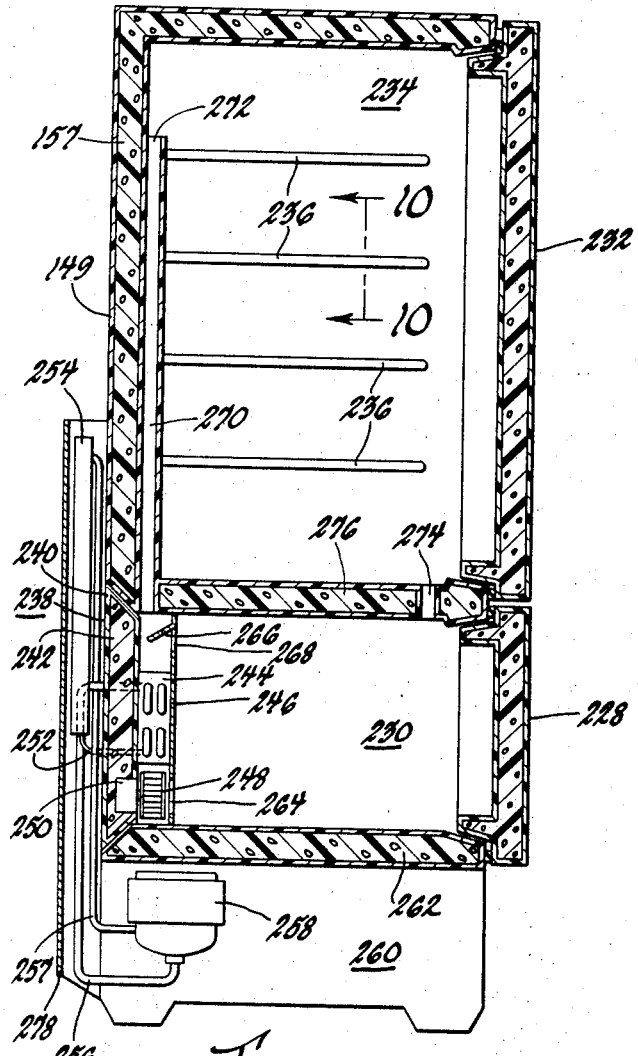
FIG. 8 is a vertical side sectional view through the completed refrigerator.
Figure 9:
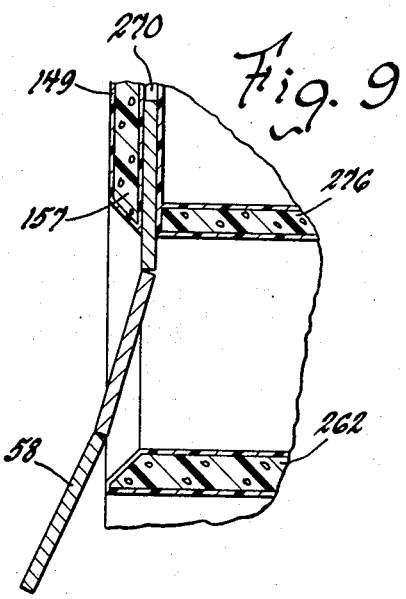
FIG. 9 is a fragmentary vertical sectional view showing the method of removing the passage molding inserts from the completed hollow walled plastic cabinet structure after the insulating step.
Figure 10:
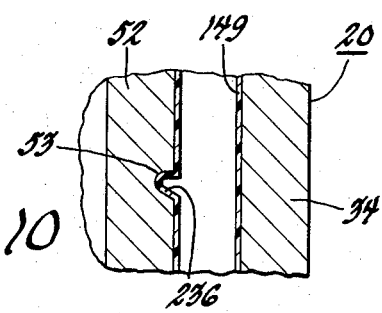
FIG. 10 is a fragmentary vertical sectional view taken along the lines 10—10 of FIGS. 4 and 8 showing the forming of the shelf supports by the mold.

The mold also includes removable inner walls including lower and upper walls 36 and 38 and a rear wall 40 and side walls 44 for forming a lower compartment 42 as well as lower and upper walls 46 and 48, rear wall 50 and inner side walls 42, for forming an upper compartment 54. It should be noted that as shown in FIG. 10, the inner side wall molds 52 have transverse recesses 53 therein which mold the shelf supports 236 which are formed in the inner side walls of the above freezing food compartment 234 as shown in FIG. 8. In addition to providing suitable communicating passages between the compartments, there extends between the center rear portion of the inner wall 38 and a rearwardly extending shoulder 56 of the wall 50, three connected inserts 58 which are held by the wall 38 and the shoulder 56 in spaced relation with an adjacent groove 60 formed in the central vertical face of the wall 50 as illustrated in FIGS. 2–6. The inserts 58 are preferably telescoped together for maintaining their alignment during the casting and are linked together so that they can be readily pulled out as illustrated in FIG. 9. In addition there are provided between the inner walls 38 and 46 three laterally spaced inserts 62 as best shown in FIGS. 3 and 4 providing three corresponding passages to provide additional communication between the compartments.

After the mold 20 has been thus formed and assembled, the plugs 28 in the bottom wall 26 are removed and the mold is inverted as shown in FIG. 3. A suitable plastic resin mixture is supplied through the supply pipe 64, the distributor 66 and the branch pipes 68 through the apertures 70 provided by the removal of the plugs 28 into the space 72 formed within the hollow walls of the mold 20 formed by the inner surfaces of the mold member 22, 26, 30 and 34 and the outwardly facing surfaces of the mold member 36, 38 to 40, 46 to 52, and 44. The amount of plastic resin supplied through the tubes 68 is precisely measured and as illustrated in FIG. 3, will provide two piles 74 in the hollow space. The resin supply apparatus comprising the elements 64 to 68 is then removed and the plugs 28 replaced to reclose the space 22 in the hollow walls of the mold. The space 72 is continuously connected so that the piles of plastic resin are free to move throughout this space.

Figure 1:
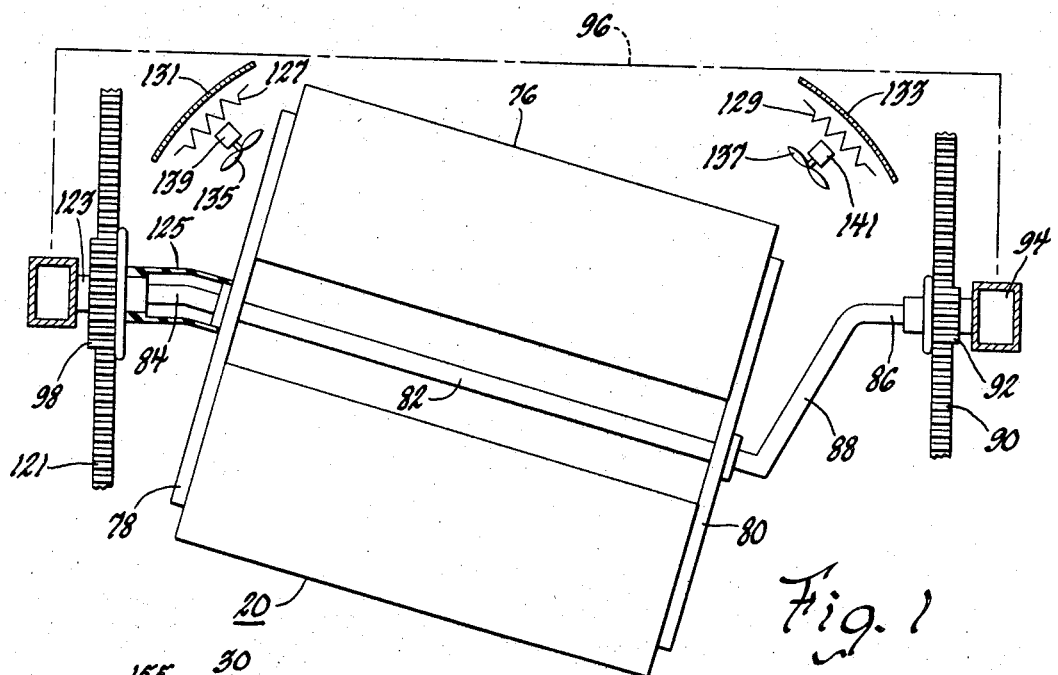
FIG. 1 is a diagrammatic view illustrating the molds and the apparatus used for heating and rotating the molds during the casting of the hollow walled plastic cabinet structure.

The mold 20, as well as one or two other similar molds 76 are fastened between the supports 78 and 80 of the revolving mechanism illustrated in FIG. 1. These supports 80 and 78 are rotatably mounted on the shaft 82 and the molds 20 and 76 as well as the supports 78 and 80 are statically balanced. The shaft 82 is inclined between the supports 78 and 80 off center from the axis of its opposite ends 84 and 86. Between the inclined central portion 82 and the end 86 is an inclined connecting portion 88. The end 86 is connected to a large driven gear 90 which is driven at a speed of about 10–15 r.p.m. by a pinion 92 from a power drive 94. The power drive 94 through a transmission 96 illustrated diagramatically drives a second pinion 98 which in turn drives at a speed of about 20–30 r.p.m. a second driven gear 121 which is rotatably mounted on the end 84 of the shaft 82. This end 84 is also rotatably mounted in a bearing 123. The driven gear 121 through a flexible or intermeshing sleeve 125 is connected to the support 78 to rotate this support 78 independently of the rotation or revolution of the shaft 82 by the driven gear 90. The rotation takes place slowly to distribute the piles of resin 74 throughout the walls of the mold. For example, the shaft 82 may be revolved at 10 or 15 r.p.m. while the gear 121, the sleeve 125, the supports 78 and 80 and the molds 20 and 76 may be rotated at 20 or 30 r.p.m. The shaft 82 and the molds may be either rotated in the same direction as shown or if desired in opposite directions.

After the rotation and revolution of the molds 20 and 76 is started, they are heated to an elevated temperature by any suitable means. For example, they may be heated by the electric heaters 127, 129 provided with reflectors 131 and 133. These heaters 127 and 129 may be of the infrared type or they may be either the sheathed tubular type of electric heater or the bare resistance wire type of heater emitting rays of various wave length including some in the infrared region. To secure better heat transfer, forced air circulation is provided by the fans 135 and 137 driven by the electric motors 139 and 141.

The outer surfaces of the molds 20 and 76 may be treated to increase or reduce the temperature of the mold at any desired points to increase or reduce the wall thickness of the hollow walled plastic structure to be formed therein. For example, when it is desired to provide thicker plastic wall thickness, the adjacent outer surface of the mold may be covered with lamp black or dull gray material while at areas in which it is desired to reduce the thickness, the outer surface of the mold may be highly polished or painted with white or bright aluminum paint. The mold should be heated to a sufficient temperature to cause the plastic resin within the space 72 to melt upon and coat all the wall surfaces of the space 72 to the thickness desired to form a plastic hollow wall structure such as is illustrated in FIGS. 2 and 4–10. The molds should be heated to temperatures of about 350° to 400°. The temperatures, of course, will vary according to the plastic resin composition used and the speed and elapsed time of the turning. The rotation and heating of the molds continues until the plastic resin has melted and coated all the interior walls of the space 72 to the thickness desired. Thereafter the revolution and rotation is continued at the same or different speed while the heating is stopped and the fans 135 and 137 are employed to cool the molds below the setting temperature of the resin.

After this, the removable plugs 143 provided in the rear wall 22 as shown in FIG. 4 are removed and aligned apertures 145 and 147 are cut in the rear wall of the hollow walled plastic resin cabinet structure 149 by a suitable cutting tool 151 operated by the power tool 153 as illustrated in FIG. 5. As shown in FIG. 6, into the space 155 of the hollow walled plastic resin cabinet structure 149 there is introduced through the aligned apertures 145 and 147 a plastic resin foam forming material 157. This is supplied from the mixer 159 illustrated in FIG. 6. This mixer 159 includes a supply pipe 161 for the "A" component and a supply pipe 163 for the "B" component as well as a return pipe 165 for recirculating the "A" component and a return pipe 167 for recirculating the "B" component. A unitary control 169 is provided which selects either the recirculation of the "A" and "B" components from their supply pipes to their return pipes or to discharge these components into a mixing chamber within the mixer 159 which delivers the mixed components through a supply conduit 171 through the apertures 145 and 147 into the space 155 in sufficient quantity to produce a foamed cellular plastic resin sufficient in quantity to fill the space 155 throughout the walls of the structure 149. One specific example of such a supply system is illustrated in U.S. Patent No. 3,128,995 issued Apr. 14, 1964. The hollow walled plastic resin cabinet structure 149 is retained in the mold 20 until the foaming is completed and the mold is no longer required to support the walls thereof to prevent their distortion. Molds may be kept at a satisfactory temperature such as 110 to 150° during the foaming operation to produce the most desirable foam insulation. The openings 145 and 147 through which the foam forming materials are introduced may be closed by a plug 146 of plastic resin.

The foamed cabinet structure can then be removed from the molds and placed in a suitable oven maintained at a suitable temperature such as 150° F. for a suitable period of time as 1 hour for curing of the foam insulation. As one specific example of the resin employed to initially form the hollow walls, a polyvinylchloride resin of the following composition may be used:

| | Parts |
|---|---|
| Polyvinylchloride polymer having an average apparent density of 15 lbs. per cu. ft., and an average particle size of 1.7 microns | 50 |
| Polyvinylchloride polymer powder having an average apparent density of 20-25 lbs. per cu. ft. of a fineness that 100% will pass through a 200 mesh screen | 50 |
| Polymeric epoxydized soya bean oil | 30 |
| Dioctylphthalate | 36 |
| Metallo organo stabilizer | 13.5 |
| Acrylicmonomer | 90 |
| Tert butyl perbenzoate | 1 |
| Polyethylene glycol mono-oleate | .10 |
| Dimethylsilicone 200 centistokes viscosity | .20 |
| Titaniumdioxide powder | 12 |
| Blue dye (anthraquinone) | .10 |

The dye may be omitted if desired. Other plastic resins such as high density linear polyethylene or polypropylene powder may be used instead of the polyvinylchloride polymers if desired.

For supplying the foam forming materials, the "A" component is a prepolymer made from 79 parts by weight of a polydiioscyanate mixture comprising 80 parts by weight of 2,4-toluene diisocyanate and 20 parts by weight of 2,6 toluene diisocyanate together with 21 parts by weight of a polyether "A" as defined hereinafter. Polyether "A" is made up of:

| | | |
|---|---|---|
| Sucrose | parts | 1 |
| Propylene oxide | do | 11 |
| Ethylene oxide | do | 4 |
| OH No. | | 445–470 |
| Water—max. by wt. | percent | .15 |
| Viscosity cps. at 25° C. | | 22,000 to 32,000 |
| pH | | 3.5 to 5 |

Note.—All quantities expressed in mols unless otherwise noted.

The "B" component is composed of 87 parts by weight of the same polyether "A" as listed above to 3 parts by weight of an activator which consists of 2 parts by weight of tetramethylbutane-diamine and 1 part by weight of organosilicone surfactant and 38 parts of trichloromonofloromethane. The "A" and "B" components are separately introduced from the supply pipes 161 and 163 delivering under the control of the handle 169 directly into the mixing chamber of the mixer 159 in the proportions of 100 parts by weight of the "A" or prepolymer component to 128 parts by weight of the "B" or polyether component. These are mixed in the mixing chamber and delivered through the discharge pipe 171 into the insulation space 155 as illustrated in FIG. 6. If desired, other plastic resin foams may be used such as epoxy foams as disclosed in the Wismer et al. Patent No. 3,051,665.

Figure 11:
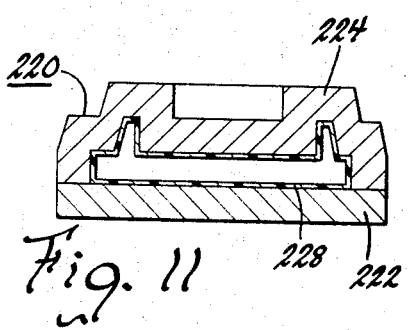
FIG. 11 is a transverse sectional view through a similar mold for one of the doors of the cabinet.

The doors for the cabinet may be made by a similar process. A mold 220 for the lower door is illustrated in FIG. 11 and includes a bottom part 222 and a top part 224. The mold preferably has a plugged opening on the edge and is supplied with a measured amount of polyvinylchloride or polyethylene or polypropylene plastic resin after which it is revolved and heated in a manner similar to that illustrated in FIG. 1 until the inner surfaces of the mold are coated with solid plastic resin to the desired thickness to form a hollow door shell. The interior of the hollow door shell thus formed in filled with plastic resin foam of the same composition as set forth above through an opening cut therein in a manner similar to that previously described for the cabinet. This forms the lower door 228 providing a closure for the below freezing compartment 230. The upper door 232 is made in a similar manner from similar materials and provides a closure for the above freezing food compartment 234.

As illustrated in FIG. 2, the rear wall 22 of the mold is provided with an inwardly extending projection which forms an opennig at the rear of the lower compartment 230. This is closed by the removable wall section 238 which is made similar to the lower door 228 of similar materials in a mold somewhat similar to that shown in FIG. 11. It is composed of a hollow shell 240 of plastic resin which is filled with foamed plastic resin 242. Connected to and mounted upon this removable wall section 238 is a refrigerant evaporator 244 as well as a partition wall 246 in front of the evaporator as well as a centrifugal fan 248 driven by an electric motor 250 which is embedded in the removable wall section 238. One refrigerant conduit connection 252 connects the bottom of the evaporator 244 with the bottom of the condenser 254 while the top of the evaporator 244 is connected by the conduit 256 with the inlet of the sealed motor compressor unit 258 which is located within the machinery compartment 260 beneath the bottom wall 262 of the lower compartment 230. The outlet of the sealed motor compressor unit 258 is connected by the conduit 257 with the top of the condenser 254.

The fan 248 draws air through the aperture 264 directly in front of it in the partition wall 246 and discharges the air upwardly between the fins of the evaporator 244. The partition wall 246 has a lip 266 which is struck inwardly to provide an upper opening 268 in the wall 246. The major portion of the air, after passing through the evaporator 244, is deflected by the lip 266 forwardly through the aperture 268 into the compartment 230. The remainder of the air passes upwardly through the duct 270 which has been formed on the back wall as illustrated in FIGS. 2-6, and is discharged through the opening 272 at the top thereof for distribution in the above freezing compartment 234. This air is returned through three small apertures 274 in the wall 276 which separates the compartments 230 and 234. These apertures 274 are provided by the molding inserts 62 as illustrated particularly in FIGS. 2-4. The removable wall section 238 and the compressor 258 and the condenser 254 are structurally connected together to form a removable unit and supported on the rear wall of the cabinet by the enclosing wall 278 which with the rear wall forms a chimney to provide for the natural draft flow of air over the compressor and condenser.

While the embodiments of the present invention as herein disclosed, constitutes a preferred form, it is to be understood that other forms might be adopted.

What is claimed is as follows:

1. The process of making an insulated cabinet which includes providing a hollow walled mold having inner surfaces of the configuration desired for the inner and outer walls of the cabinet, inserting into the space within the hollow walls of the mold an amount of plastic resin sufficient to coat the walls to the desired thickness, heating the mold to elevated temperatures sufficient to melt the plastic resin, revolving the mold about a first axis and simultaneously rotating the mold about a second axis sufficiently to coat substantially all the hollow walls of the mold to the desired thickness with the plastic resin to form a substantially continuous hollow walled plastic structure and filling the interior of the hollow walls of the plastic structure with a plastic resin foam.

2. The process of making a plastic structure which includes providing a hollow mold having inner surfaces of the configuration desired, inserting into the hollow space within the mold an amount of plastic resin sufficient to coat the walls to the desired thickness, heating the mold to elevated temperatures sufficient to melt the plastic resin, revolving the mold about a first axis to a first speed and simultaneously rotating the mold about a second axis at a second substantially different speed sufficiently to coat substantially all the inner walls of the mold to the desired thickness with the plastic resin to form the plastic structure and filling the interior of the hollow walls of the plastic structure with a plastic resin foam.

3. The process of making a plurality of plastic structures which includes providing a plurality of hollow molds having inner surfaces of the configuration desired, inserting into the hollow spaces within the molds an amount of plastic resin sufficient to coat the walls to the desired thickness, grouping a plurality of said molds symmetrically about a first axis and heating the molds to elevated temperatures sufficient to melt the plastic resin, rotating said molds about said first axis at a first speed and simultaneously revolving said molds about a second axis at a second substantially different speed sufficiently to coat substantially all the inner walls of the mold to form a plurality of hollow plastic structures and filling the interior of the hollow walls of the plastic structures with a plastic resin foam.

References Cited

UNITED STATES PATENTS 2,950,505    8/1960    Frank _____ 264—45
3,217,078    11/1965    Kleiber _____ 264—310

JULIUS FROME, *Primary Examiner.*

L. M. GARRETT, *Assistant Examiner.*

U.S. Cl. X.R.

264—53